E. B. MÉRIGOUX.
MEANS TO CONNECT TIRES TO RIMS OF WHEELS.
APPLICATION FILED OCT. 24, 1908.
936,008.  Patented Oct. 5, 1909.
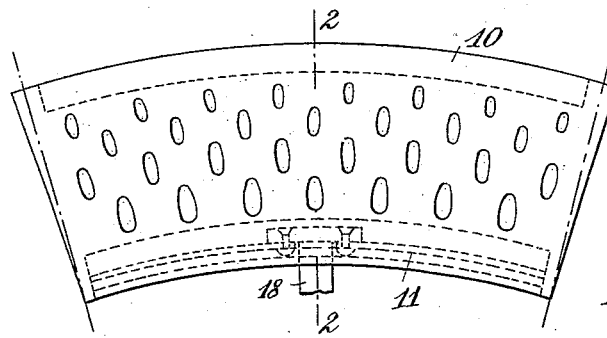
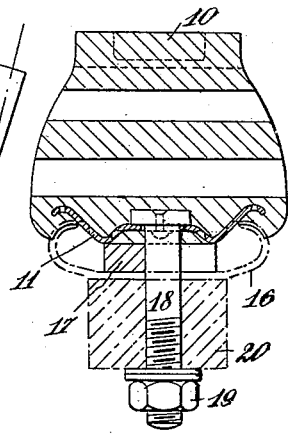
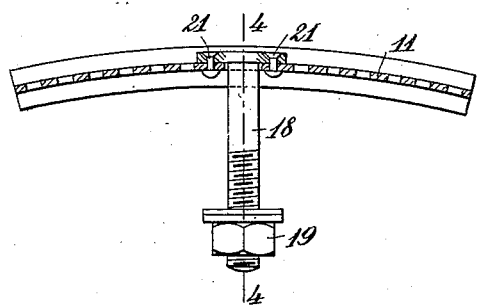
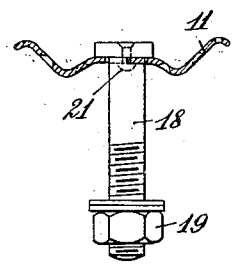
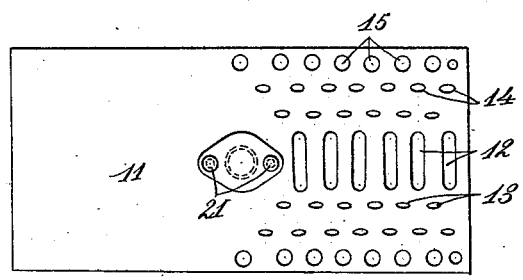
Witnesses:
C. M. Crawford
E. Schallinger
Inventor:
Emile Baptiste Mérigoux
by B. Singer
Attorney

UNITED STATES PATENT OFFICE.

EMILE BAPTISTE MÉRIGOUX, OF PARIS, FRANCE.

MEANS TO CONNECT TIRES TO RIMS OF WHEELS.

936,008.

Specification of Letters Patent. Patented Oct. 5, 1909.

Application filed October 24, 1908. Serial No. 459,377.

*To all whom it may concern:*

Be it known that I, EMILE BAPTISTE MÉRIGOUX, a citizen of the Republic of France, residing at Paris, in France, have invented new and useful Improvements in or Relating to Means to Connect Tires to Rims of Wheels, of which the following is a specification.

This invention relates to improvements in resilient tires, said improvements being for the purpose of connecting the elements of the tire to the rim of the wheel.

In the drawings fully illustrating my invention, Figure 1 is an elevation of one of the elements of the tire; Fig. 2 is a vertical section on the line 2—2 of Fig. 1; Fig. 3 is a longitudinal section of the metallic part of an element; Fig. 4 is a transverse section on line 4—4 of Fig. 5; and Fig. 5 is a plan view of Fig. 3.

The resilient element of rubber shown in Figs. 1 and 2 consists of a segment 10 embracing a determined part of the circumference of the wheel. The said resilient element 10 is fixed on a metallic element 11 consisting also of a segment of a circle; the transverse section of this element 11 is circumferentially corrugated to give greater resistance and also to embed it more easily either totally or partly in the elastic element. For this purpose it is provided on each side of the center with several rows of holes 12, 13, 14 and 15, the latter 15 being made conical so that their larger openings are radially inwardly. The elastic element 10 is larger than the metallic element 11 (Fig. 2) and is so arranged that it completely covers the edges of the latter which is thus embedded in the rubber which penetrates the holes 12 and 13 on each side of the center of the metallic element 11 and completely fills the interior circular channel formed by the latter. The rubber also penetrates through the holes 15 in such way as to connect the parts of the elastic element which surround the edges of the metallic element 11. The rubber fills also the holes 14 and forms a series of swallow-tail connections which resist the separation of the two elements.

The metallic elements constructed as hereinbefore described are fixed on a metallic rim 16 (Fig. 2) preferably of the ordinary form suitable for pneumatic tires which allows the replacement of the latter by tires of my improved kind. The inner edges of the elastic element 10 are applied on the outer edges of the rim 16 as represented in the drawing and between the rim 16 and the metallic and elastic elements is arranged a strip 17 of leather, fabric, or rubber, of sufficient thickness to fill the space between the rim and the elements. Each of the metallic and elastic elements is fixed on the rim 16 by a bolt 18 arranged at its center and provided with a nut 19, the bolt it carried by the ordinary interior wooden felly 20 carrying the metallic rim 16. The head of the bolt which is carried by the metallic element 11 is embedded in the rubber of element 10 and is fixed on the said element 11 by means of rivets 21 (Fig. 5) in such a way that on screwing up the nut 19 the rubber does not have to resist any torsional strain of the bolt 18.

I claim:

1. A tire holding device comprising in combination with a solid tire and a felly, a metallic strip bent to conform to the curvature of the tire and provided with circumferentially disposed corrugations, said strip having rows of apertures and being partly embedded in the tire, a holder disposed on the felly and engaging the tire beneath its lateral margins, a strip of yielding material supporting said metallic strip on said holder, and a bolt having its head embedded in said tire and fixed to said metallic strip and extending through and securing said metallic strip, yielding strip and holder to said felly.

2. A tire holding device comprising in combination with a solid tire and a felly, a metallic strip bent to conform to the curvature of the tire and provided with circumferentially disposed corrugations and being partly embedded in the tire, a holder disposed on the rim and engaging the tire beneath its lateral margin, a strip of yielding material supporting said metallic strip on said holder, a bolt having its head embedded in said tire and extending through and securing said metallic strip, yielding strip and holder to said felly.

3. A tire holding device comprising in combination with a solid tire and a felly, a strip bent to conform to the curvature of the tire and being partly embedded therein, a tire holder disposed on said felly and engaging the tire at its lateral margins, and a bolt having its head embedded in said tire
5 and riveted to said metallic strip and extending through and securing said metallic strip and holder to said felly.

In testimony whereof I affix my signature in presence of two witnesses.

EMILE BAPTISTE MÉRIGOUX.

Witnesses:
DEAN B. MASON,
JULIUS TAVERNE.